United States Patent [19]
Sorensen

[11] Patent Number: 5,149,482
[45] Date of Patent: * Sep. 22, 1992

[54] INJECTION-MOLDING DIMENSION-CONTROL AND CLAMP-REDUCTION

[75] Inventor: Jens O. Sorensen, Rancho Santa Fe, Calif.

[73] Assignee: Primtec, Rancho Santa Fe, Calif.

[*] Notice: The portion of the term of this patent subsequent to Apr. 16, 2008 has been disclaimed.

[21] Appl. No.: 646,641

[22] PCT Filed: May 30, 1990

[86] PCT No.: PCT/US90/02982
§ 371 Date: Feb. 1, 1991
§ 102(e) Date: Feb. 1, 1991

[87] PCT Pub. No.: WO90/14936
PCT Pub. Date: Dec. 13, 1990

Related U.S. Application Data

[63] Continuation-in-part of Ser. No. 361,275, Jun. 5, 1989, Pat. No. 5,008,064.

[51] Int. Cl.⁵ .............................................. B29C 45/14
[52] U.S. Cl. ................................... 264/255; 264/268; 264/328.12; 264/328.16; 425/577
[58] Field of Search ............... 264/308, 255, 328.8, 264/328.9, 328.12, 328.16, 267, 268, 271.1, 279; 425/552, 577, 127, 129.1

[56] References Cited

U.S. PATENT DOCUMENTS

| | | | |
|---|---|---|---|
| 3,169,689 | 2/1965 | Schwartz | 229/1.5 |
| 3,178,497 | 4/1965 | Moscicki | |
| 3,194,468 | 7/1965 | Baron | 229/1.5 |
| 3,375,554 | 3/1968 | Blumer | |
| 3,679,119 | 7/1972 | Copping | 229/15 |
| 3,737,272 | 6/1973 | Segmuller | 425/248 |
| 3,832,110 | 8/1974 | Hehl | 425/130 |
| 3,944,124 | 3/1976 | Hexel | 229/1.5 |
| 3,995,008 | 11/1976 | Spiegelberg | 264/328 |
| 4,140,828 | 2/1979 | Copping | 428/167 |
| 4,264,295 | 4/1981 | Hingley | 425/577 |
| 4,307,137 | 12/1981 | Ota et al. | 428/35 |
| 4,381,275 | 4/1983 | Sorensen | 264/328.8 |
| 4,422,995 | 12/1983 | Schad | 264/250 |
| 4,467,994 | 8/1984 | Sorensen | 249/144 |
| 4,508,676 | 4/1985 | Sorensen | 264/328.8 |
| 4,743,420 | 5/1988 | Dutt | 264/102 |
| 4,789,326 | 12/1988 | Sorensen | 425/575 |
| 4,807,775 | 2/1989 | Sorensen | 220/72 |
| 5,008,064 | 4/1991 | Sorensen | 264/308 |

FOREIGN PATENT DOCUMENTS

| | | |
|---|---|---|
| 1757770 | 7/1970 | Australia . |
| 1816466 | 6/1970 | Fed. Rep. of Germany . |
| 60-71217 | 8/1985 | Japan . |
| 2138736 | 10/1984 | United Kingdom . |

*Primary Examiner*—Jill L. Heitbrink
*Attorney, Agent, or Firm*—Edward W. Callan

[57] ABSTRACT

The dimensions of an injected molded hollow plastic product are controlled and the separative force exerted against mold sections during molding of the product are reduced by injecting plastic material continuously from a gate into a mold cavity having flow channels extending through the cavity region until the mold cavity is filled with said injected plastic material, with said injection being under such conditions of injection pressure, injected plastic material temperature, mold cavity temperature, flow channel length, distance between flow channels, flow channel thickness and wall thickness in a thin-cavity region between flow channels that initially injected plastic material solidifies in the thin-cavity regions to thereby stabilize one mold section in relation to the other mold section prior to the mold cavity being filled with the injected plastic material, and to thereby reduce said separative force.

12 Claims, 2 Drawing Sheets

FIG. 1

INJECTION-MOLDING DIMENSION-CONTROL AND CLAMP-REDUCTION

CROSS REFERENCE TO RELATED APPLICATION

This application is a continuation in part of copending U.S. patent application Ser. No. 07/361,275 filed Jun. 5, 1989 now U.S. Pat. No. 5,008,064 issued Apr. 16, 1991.

BACKGROUND OF THE INVENTION

The present invention generally pertains to injection molding of plastic products and is particularly directed to improvement in methods of controlling the wall thickness of a plastic product while being injection-molded and improvement in methods of reducing the clamping force requirements of a plastic product while being injection molded.

Prior art methods for controlling the wall thickness of a plastic product while being injection molded and for reducing the clamping force requirements of a plastic product while being injection molded are described in U.S. Pat. No. 3,375,554 to Blumer, U.S. Pat. No. 3,737,272 to Segmuller, U.S. Pat. No. 3,995,007 to Spiegelberg, U.S. Pat. No. 4,264,295 to Hingley and U.S. Pat. Nos. 4,381,275; 4,467,994; 4,508,676 and 4,789,326 all to Sorensen.

SUMMARY OF THE INVENTION

The present invention provides a method of controlling the dimensions of a hollow plastic product that is injection molded within the cavity of a mold having a core section and a cavity section defining the mold cavity therebetween and separated by a parting line, by stabilizing the core section in relation to the cavity section. The method includes the steps of:

(a) injecting a first plastic material into the mold cavity so that only a part of the mold cavity is filled;

(b) cooling the injected first plastic material in the mold cavity;

(c) injecting subsequent to injecting the first plastic material; a second plastic material into the mold cavity so that the cooled injected first plastic material in said section extending between the core section and the cavity section of the mold cavity is sufficiently solidified to stabilize the core section in relation to the cavity section by impeding movement of the core section in relation to the cavity section caused by injecting the second plastic material, whereby the injected second plastic material fills the mold cavity; and (d) cooling the injected plastic material in the mold cavity to thereby solidify the product;

the method being characterized by the following additional steps, step (a) comprising the step of:

(e) continuing the injection of the first plastic material by the second plastic material without intermission;

step (b) comprising the step of:

(f) cooling a portion of the first plastic material so that it is at least partially solidified and so that another portion of the first plastic material remains fluid;

step (c) comprising the step of:

(g) injecting the second plastic material so that the second plastic material displaces some of the fluid first plastic material to thereby provide at least one flow path for the second plastic material to fill the mold cavity and so that some of the at least partially solidified first plastic material stabilizes the core section in relation to the cavity section.

In another aspect, the present invention provides a method of controlling dimensions of a hollow plastic product having perimetric side walls that is injection molded by using a core mold section and a cavity mold section that are combined to define a mold cavity for the product therebetween, and which mold sections, when so combined, are separated by a parting line, wherein the mold cavity includes a gate in a base region and flow channels extending from the base region through a region of the cavity that defines the side walls of the product, the method comprising the step of injecting plastic material continuously into the mold cavity from the gate until the mold cavity is filled with said injected plastic material, with said injection being under such conditions of injection pressure, injected plastic temperature, mold cavity wall temperature, flow channel length, distance between flow channels, flow channel thickness and wall thickness in a thin-cavity region between flow channels that initially injected plastic material solidifies in the thin-cavity regions to stabilize the core mold section in relation to the cavity mold section prior to the mold cavity being filled with the injected plastic material.

I have ascertained that under the right combination of conditions of injection pressure, injected plastic material temperature and mold cavity wall temperature, the product dimensions can be controlled by this method when within a portion of the mold cavity in which dimension control is desired, the quotient of a ratio of flow channel length to distance between flow channels divided by the square of a ratio of flow channel thickness to wall thickness in a thin-cavity region between flow channels is less than two. These ratios are applicable for that portion of the mold cavity in which dimension control is desired.

The present invention also provides a method of reducing the clamping force required to produce a plastic product injection molded within the cavity of a mold having a first mold section and a second mold section defining the mold cavity therebetween and separated by a line, comprising (a) injecting a first plastic material into the mold cavity so that only a part of the mold cavity is filled:

(b) cooling the injected first plastic material in the mold cavity to solidify a portion of the first plastic material in a section of the mold cavity extending between the first mold section and the second mold section;

(c) injecting second plastic material under pressure into the mold cavity subsequent to solidifying said portion of the first plastic material; so that the cooled injected first plastic material in said section of the mold cavity to impedes transmission of injection pressure caused by injecting the second plastic material, to thereby reduce during injection of the second plastic material the clamping force required to overcome forces that tend to separate the first and second mold sections as a result of injection pressure, whereby the injected second plastic material fills the mold cavity; and (d) cooling the injected plastic material in the mold cavity to thereby solidify the product;

the method being characterized by the following additional steps, step (a) comprising the step of:

(e) continuing the injection of the first plastic material by the second plastic material without intermission;

step (b) comprising the step of:

(f) cooling a portion of the first plastic material so that it is at least partially solidified and so that another portion of the first plastic material remains fluid;

step (c) comprising the step of:

(g) injecting the second plastic material so that the second plastic material displaces some of the fluid first plastic material to thereby provide at least one flow path for the second plastic material to fill the mold cavity and so that some of the at least partially solidified first plastic material impedes transmission of injection pressure causing separative forces of the first mold section in relation to the second mold section.

In a further aspect, the present invention provides a method of reducing a separative force exerted against mold sections when injection molding a hollow plastic product that is injected by using a first old section and a second mold section that are combined to define a mold cavity for the product therebetween, and which mold sections, when so combined, are separated by a parting line, wherein the mold cavity includes a gate and flow channels extending through a region of the cavity, wherein plastic material injected into the mold cavity exerts said separative force against the mold sections while said injected plastic remains in a fluid state, the method comprising the step of injecting plastic material continuously into the mold cavity from the gate until the mold cavity is filled with said injected plastic material, with said injection being under such conditions of injection pressure, injected plastic material temperature, mold cavity wall temperature, flow channel length, distance between flow channels, flow channel thickness and wall thickness in a thin-cavity region between flow channels that initially injected plastic material solidifies in the thin-cavity regions prior to the mold cavity being filled with the injected plastic material to thereby reduce said separative force.

I have ascertained that under the right combination of conditions of injection pressure, injected plastic material temperature and mold cavity wall temperature, the separative force can be reduced by this method when within a portion of the mold cavity in which separative-force reduction is desired, the quotient of a ratio of flow channel length to distance between flow channels divided by the square of a ratio of flow channel thickness to wall thickness in a thin-cavity region between flow channels is less than two. These ratios are applicable for that portion of the mold cavity in which separative force reduction is desired.

Contrary to the prior art mentioned under the title "Background of the Invention" above, these methods may be executed without the help of retractable portions of the mold sections, multiple gates, temporary cavity-section-to-free-end-of-core-section contact, throttles, valves or reduced throats, and without the use of complementary shaped formations, but that is not to imply that the present invention cannot be executed in combination with one or more or such features.

The methods of the present invention are particularly well suited for injection molding of products with laminated walls. In such cases the mold cavity may contain a first injected plastic product which was injected in a previous injection cycle, so that the injection of first and second plastics according to the invention provides a plastic material coating of the first injected plastic product.

The present invention also provides a method of controlling the dimensions of a hollow plastic product having laminated walls injection molded within the cavity of a mold having a core section and a cavity section defining the mold cavity therebetween and separated by a parting line, comprising stabilizing the core section in relation to the cavity section and providing in advance an early layer of the laminated plastic product encased in the mold cavity and further comprising the steps of:

(a) injecting a first plastic material into the mold cavity which encases the early layer so that only a region of the early layer is coated by the injected first plastic;

(b) cooling the injected first plastic material in the mold cavity;

(c) injecting subsequent to injecting the first plastic material, a second plastic material extending between the early layer and either the core section or the cavity section into the mold cavity so that the cooled injected first plastic material in combination with the early layer of said region are sufficiently solidified to stabilize the core section in relation to the cavity section by impeding movement of the core section in relation to the cavity section caused by injecting the second plastic material, whereby the injected second plastic material further fills the mold cavity thereby further coating the early layer; and (d) cooling the injected plastic material in the mold cavity to thereby solidify the laminated product.

The present invention further provides a method of reducing the clamping force required to produce a plastic product having laminated walls injection molded within the cavity of a mold having a first mold section and a second mold section defining the cooling cavity therebetween and separated by a parting line, comprising providing in advance an early layer of the laminated plastic product encased in the mold cavity and further comprising the steps of:

(a) injecting a first plastic material into the mold cavity which encases the early layer so that only a region of the early layer is coated by the injected first plastic;

(b) cooling the injected first plastic material in the mold cavity to solidify a portion of the first plastic material in a section of the mold cavity extending between the first mold section and the second mold section;

(c) injecting a second plastic material under pressure into the mold cavity subsequent to solidifying said portion of the first plastic material so that the cooled injected first plastic material in combination with the early layer of said region in said part of the mold cavity impedes transmission of injection pressure caused by injecting the second plastic material, to thereby reduce during injection of the second plastic material the clamping force required to overcome forces that tend to separate the first and second mold sections as a result of injection pressure, whereby the injected second plastic material further fills the mold cavity thereby further coating the early layer; and (d) cooling the injected plastic material in the mold cavity to thereby solidify the laminated product.

The present invention still further provides a method of controlling the dimensions of a hollow plastic product having laminated walls injection molded in the cavity of a mold having a core section and a cavity section defining the cooling cavity therebetween and separated by a parting line, comprising stabilizing the core section in relation to the cavity section and comprising the steps of:

(a) injecting a first plastic material into the mold cavity so that only a part of the mold cavity is filled;

(b) cooling the injected first plastic material in the mold cavity;

(c) injecting subsequent to injecting the first plastic material, a second plastic material into the mold cavity so that the cooled injected first plastic material extending between the core section and the cavity section in said part of the mold cavity is sufficiently solidified to stabilize the core section in relation to the cavity section by impeding movement caused by injecting the second plastic material, whereby the injected second plastic material fills the mold cavity;

(d) cooling the injected plastic material in the mold cavity to thereby solidify the laminated product; and (e) encasing the early layer in a second mold cavity and injecting a third plastic material into the second mold cavity thereby coating the early layer with the third plastic material to mold the laminated plastic product.

The present invention additionally provides a method of reducing the clamping force required to produce a plastic product having laminated walls injection molded in the cavity of a mold having a first mold section and a second mold section defining the cooling cavity therebetween and separated by a parting line, comprising (a) injecting a first plastic material into the mold cavity so that only a part of the mold cavity is filled;

(b) cooling the injected first plastic material in the mold cavity to solidify a portion of the first plastic material in a section of the mold cavity extending between the first mold section and the second mold section;

(c) injecting a second plastic material under pressure into the mold cavity subsequent to solidifying said portion of the first plastic material, so that the cooled injected first plastic material in said part of the mold cavity impedes transmission of injection pressure caused by injecting the second plastic material in to thereby reduce during injection of the second plastic material the clamping force required to overcome forces that tend to separate the first and second mold sections as a result of injection pressure, whereby the injected second plastic material fills the mold cavity;

(d) cooling the injected plastic material in the mold cavity to thereby provide an early layer of the laminated product; and (e) encasing the early layer in a second mold cavity and injecting a third plastic material into the second mold cavity thereby coating the early layer with the third plastic material to mold the laminated plastic product.

Additional features of the present invention are described in relation to the description of the preferred embodiments.

Figure 1:
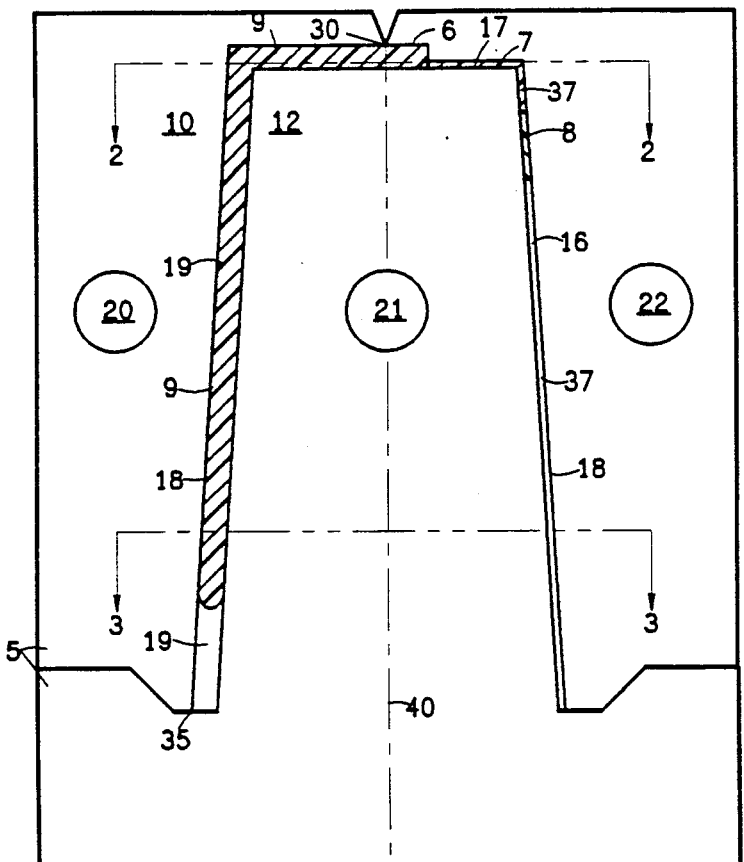
FIG. 1 is a sectional view of a mold used to execute one preferred embodiment of the method of the present invention.
Figure 2:
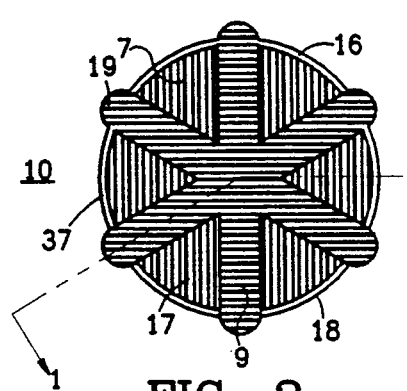
FIG. 2 is a sectional view of the mold shown in FIG. 1 taken along lines 2—2.
Figure 3:
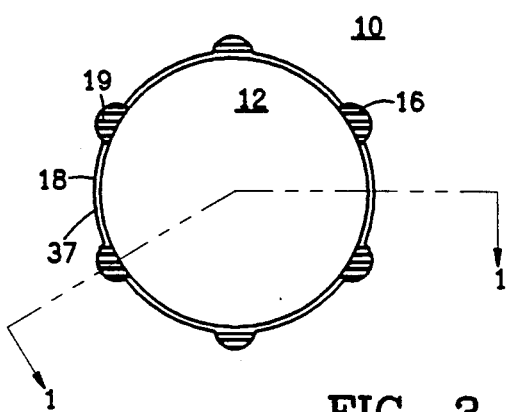
FIG. 3 is a sectional view of the mold shown in FIG. 1 taken along lines 3—3.

The sectional view of FIG. 1 is taken along lines 1—1 of FIG. 2 and along lines 1—1 of FIG. 3.

Figure 4:
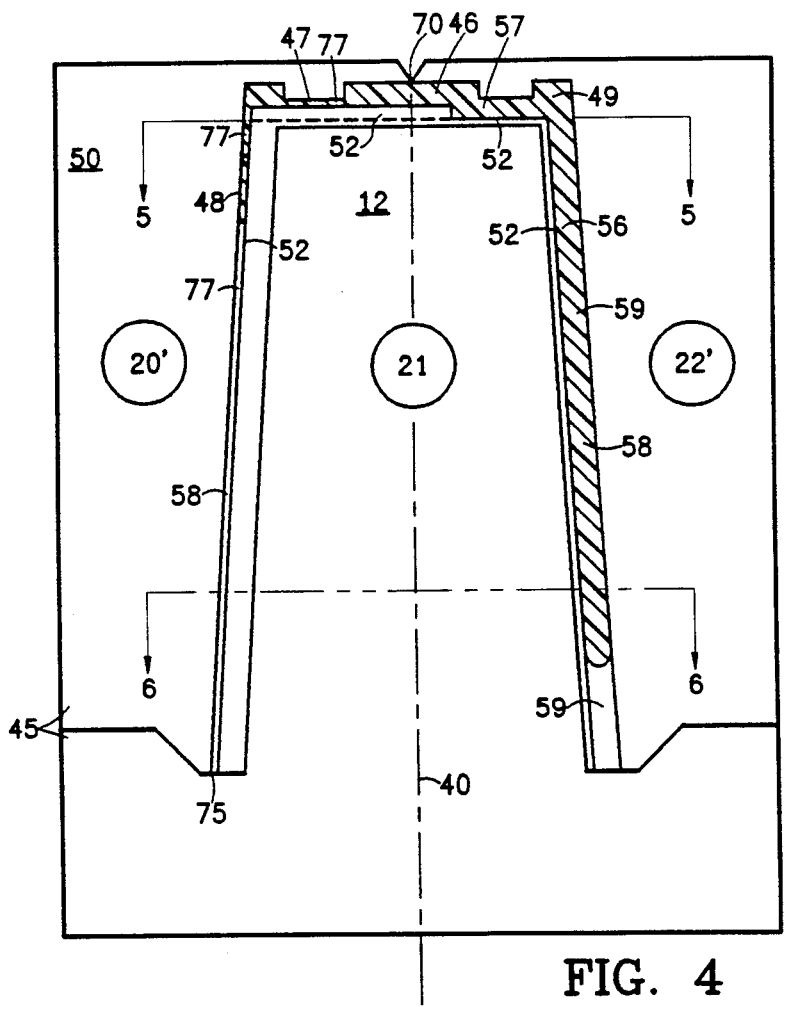

FIG. 4 is a sectional view of a mold used to execute a preferred embodiment of the method of the present invention for molding a hollow plastic product with laminated walls.

Figure 5:
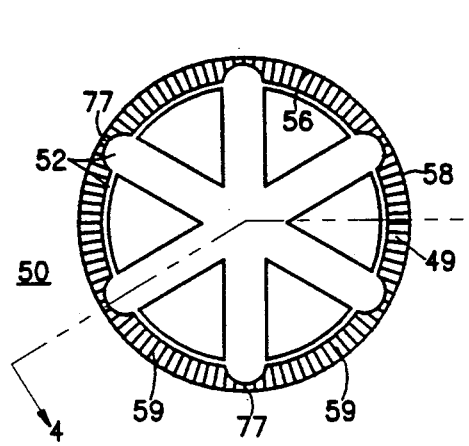

FIG. 5 is a sectional view of the mold shown in FIG. 4 taken along lines 5—5.

Figure 6:
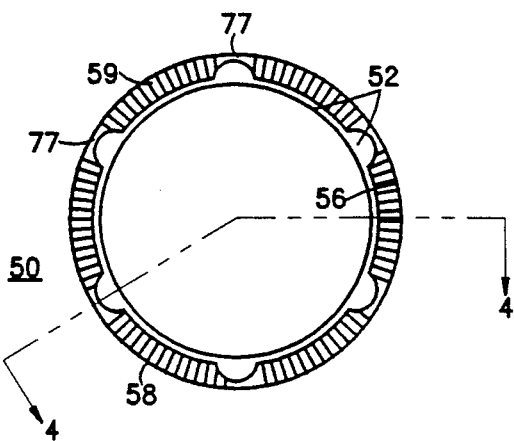

FIG. 6 is a sectional view of the mold shown in FIG. 4 taken along lines 6—6.

The sectional view of FIG. 4 is taken along lines 4—4 of FIG. 5 and along lines 4—4 of FIG. 6.

The product wall thickness shown in the Drawing are increased in order to better show the invention. The actual wall thicknesses are normally much smaller, and depend on the type of plastic material, the temperature of the plastic material, the mold temperature, the thermal conductivity of the mold wall material, the flow distances, the injection pressure, and other molding parameters.

DESCRIPTION OF THE PREFERRED EMBODIMENTS

Referring to FIGS. 1, 2 and 3, the preferred embodiment of the invention utilizes a mold 5 with a cavity mold section 10 and a core mold section 12, shown in its assembled arrangement. The mold 5 defines a mold cavity 16 for forming a plastic product having perimetric side walls, not shown in its fully molded outline. The mold cavity 16 includes a base region 17, a side-wall-defining region 18 and flow channels 19 extending from the base region 17 through the side-wall-defining region 18.

Cooing means 20, 21 and 22 are used to cool both the first and second injected plastic material. Molten plastic material may be injected into the mold cavity 16 via a gate 30 located in the center of the base region 17 of the mold cavity 16. The cavity section 10 and the core section 12 are separated by a parting line 35. The mold cavity 16 may be opened along axis 40 for ejection of a molded product.

The methods of the preferred embodiment are executed as follows. A first plastic material 6, 7, 8, 9 is injected into the mold cavity 16 so that only a part of the mold cavity 16 is filled, a second plastic material is injected without intermission. The first plastic material has the same chemical composition as the second plastic material.

A portion of the first plastic material 7 cools in the thin cavity region 37 between flow channels 19 before the second plastic material is injected so that it is at least partially solidified and so that another portion of the first plastic material 6, 8, 9 remains fluid.

The at least partially solidified portion of the first plastic cools very fast before a second plastic material is injected, because the wall thickness of the thin-cavity region 37 is very thin. Another portion of the first plastic material 6, 9 remains fluid because the wall thickness of the flow channels 19 is relatively thick. Another portion 8 of the first plastic material also remains fluid.

Subsequent to injecting the first plastic material 6, 7, 8, 9, a second plastic material is injected into the mold cavity via the gate 30. The second plastic material displaces some of the fluid first plastic material in the flow channels 19, and thereby induces a number of flow paths 9 for the second plastic to fill the mold cavity 16.

Some of the at least partially solidified first plastic material 7 in the thin cavity regions 37 is sufficiently solidified to stabilize and support the core section 12 in relation to the cavity section 10 by impeding movement caused by injecting the second plastic material.

Some of the at least partially solidified first plastic material 7 in the thin cavity regions 37 is also sufficiently solidified to impede transmission of injection pressure in the first plastic material 7, caused by injecting the second plastic material which effect separative forces of the core mold section 12 in relation to the cavity mold section 10. The injected plastic material is then cooled to completely solidify the product.

The first plastic material is injected so that it does not completely cover the parting line 35 and fill the mold cavity 16, and the second plastic material is injected so that it completely covers the parting line and fills the mold cavity 16.

An example is as follows, the thin product wall thickness in the thin cavity regions 37 being 0.15 mm, the thick product wall thickness of the flow channels 19 being 0.6 mm, the plastic material being polypropylene or polystyrene at a temperature of 300 degrees C., the mold temperature being 10 degrees C., the thermal conductivity of the mold being that of steel, the flow distance through the side-wall defining region 18 of the flow channels 19 being about 150 mm, the distance between flow channels 19 being about 5 mm, and the injection pressure being 2000 Bar.

Referring to FIGS. 4, 5 and 6, the preferred embodiment of the invention used when molding a hollow plastic product with laminated walls utilizes a mold 45 with a cavity mold section 50 and a core mold section 12, shown in its assembled arrangement. The mold 45 defines a mold cavity 56 for forming a plastic product having laminated perimetric side walls, not shown in its fully molded outline. An early layer 52 of the laminated plastic product is encased on the core section 12 in the mold cavity 56. The early layer 52 was formed in accordance with the embodiment of the invention described with reference to FIGS. 1, 2 and 3.

The mold cavity 56 includes a base region 57, a side-wall-defining region 58 and flow channels 59 extending from the base region 57 through the side-wall-defining region 58.

Cooling means 20', 21 and 22' are used to cool both the first and second injected plastic material. Molten plastic material may be injected into the mold cavity 56 via a gate 70 located in the center of the base region 57 of the mold cavity 56. The cavity section 50 and the core section 12 are separated by a parting line 75. The mold cavity 56 may be opened along axis 40 for ejection of a molded product.

The methods of this preferred embodiment are executed as follows. A first plastic material 47, 48, 48, 49 is injected into the mold cavity 56 so that only a part of the mold cavity 56 is filled, a second plastic material is injected without intermission. The first plastic material has the same chemical composition as the second plastic material. Only a region of the early layer 52 is coated with the first plastic material 46, 47, 48, 49, as shown in FIG. 4.

A portion of the first plastic material 47 cools in the thin cavity region 77 between flow channels 59 before the second plastic material is injected so that it is at least partially solidified and so that another portion of the first plastic material 46, 48, 49 remains fluid.

The at least partially solidified portion of the first plastic cools very fast before a second plastic material is injected, because the wall thickness of the thin-cavity region 77 is very thin. Another portion of the first plastic material 46, 48, 49 remains fluid because the wall thickness of the flow channels 59 is relatively thick.

Subsequent to injecting the first plastic material 46, 47, 48, 49, a second plastic material is injected into the mold cavity via the gate 70. The second plastic material displaces some of the fluid first plastic material in the flow channels 59, and thereby induces a number of flow paths 49 of the second plastic to fill the mold cavity 56, and further coat the early layer 52.

Some of the at least partially solidified first plastic material 47 in the thin cavity regions 77 is sufficiently solidified to combine with a sufficiently solidified portion of the early layer 52 to stabilize and support the core section 12 in relation to the cavity section 50 by impeding movement caused by injecting the second plastic material.

Some of the at least partially solidified first plastic material 47 in the thin cavity regions 77 is also sufficiently solidified to combine with a sufficiently solidified portion of the early layer 52 to impede transmission of injection pressure in the first plastic material 47, caused by injecting the second plastic material which effect separative forces of the core mold section 12 in relation to the cavity mold section 50. The injected plastic material is then cooled to completely solidify the product.

The first plastic material is injected so that it does not completely cover the parting line 75 and fill the mold cavity 56, and the second plastic material is injected so that it completely covers the parting line and fills the mold cavity 56.

In the particular preferred embodiments of the invention described herein, contrary to certain prior art methods of core steering, no retractable portion of the core section and/or the cavity section is protracted to contact the other mold section to stabilize the core section in relation to the cavity section during the continuous injection of the plastic, material; the configuration of the mold cavity as defined by the mold sections is maintained without change during the continuous injection of plastic material; the mold cavity is formed by combining mold sections that define a mold cavity that does not include any throttle between the base region and the side wall defining region; and no use is made of multiple gates, in order to create one or more flow path for the second plastic material to fill the mold cavity.

In other preferred embodiments of the present invention the first plastic material is injected into the mold cavity via more than one gate and the second plastic material is injected into the mold cavity via the same gates.

When the method of the invention is used only for reducing the required clamping force for the product and not for steering the core section, the method of the invention may be executed in molds which do not have a core section and a cavity section.

I claim:

1. A method of controlling dimensions of a hollow plastic product having perimetric side walls that is injection molded by using a core mold section and a cavity mold section that are combined to define a mold cavity for the product therebetween, and which mold sections, when so combined, are separated by a parting line, wherein the mold cavity includes a gate in a base region and flow channels extending from the base region through a region of the cavity that defines the side walls of the product, the method comprising the step of injecting plastic material continuously into the mold cavity from the gate until the mold cavity is filled with said injected plastic material, with said injection being under such conditions of injection pressure, injected plastic material temperature, mold cavity wall temperature, flow channel length, distance between flow channels, flow channel thickness and wall thickness in a thin-cavity region between flow channels that initially injected plastic material solidifies in the thin-cavity regions to stabilize the core mold section in relation to the cavity mold section prior to the mold cavity being filled with the injected plastic material.

2. A method according to claim 1, comprising the step of forming said mold cavity by combining said mold sections that define a cavity that does not include any throttle between the base region and the sidewall defining region.

3. A method according to claim 1, comprising the step of maintaining the mold cavity, as defined by the mold sections, without change in configuration during said continuous injection of plastic material.

4. A method according to claim 1, comprising the step of forming said mold cavity by combining said mold sections that do not contact each other within said mold cavity to stabilize the core mold section in relation to the cavity mold section during said continuous injection of plastic material.

5. A method according to claim 1, comprising the step of forming said mold cavity with a plastic material portion that previously was injected onto one of said one mold sections being included in said mold cavity.

6. A method of controlling dimensions of a hollow plastic product having perimetric side walls that is injection molded by using a core mold section and a cavity mold section that re combined to define a mold cavity for the product therebetween, and which mold sections, when so combined, are separated by a parting line, wherein the mold cavity includes a gate in a base region and flow channels extending from the base region through a region of the cavity that defines the side walls of the product, the method comprising the steps of (a) forming said mold cavity in which within a portion of the mold cavity, the quotient of a ratio of flow channel length to distance between flow channels divided by the square of a ratio of flow channel thickness to wall thickness in a thin-cavity region between flow channels is less than two; and (b) injecting plastic material continuously into the mold cavity from the gate until the mold cavity is filled with said injected plastic material, with said injection being under such conditions of injection pressure, injected plastic material temperature and mold cavity wall temperature that initially injected plastic material solidifies in the thin-cavity regions to stabilize the core mold section in relation to the cavity mold section prior to the mold cavity being filled with the injected plastic material.

7. A method according to claim 6, comprising the step of (c) forming said mold cavity by combining said mold sections that define a cavity that does not include any throttle between the base region and the sidewall defining region.

8. A method according to claim 6, comprising the step of (c) forming said mold cavity by combining said mold sections that do not contact each other within said mold cavity to stabilize the core mold section in relation to the cavity mold section during said continuous injection of plastic material.

9. A method of reducing a separative force exerted against mold sections when injection molding a hollow plastic product that is injected by using a first mold section and a second mold section that are combined to define a mold cavity for the product therebetween, and which mold sections, when so combined, are separated by a parting line, wherein the mold cavity includes a gate and flow channels extending through a region of the cavity, wherein plastic material injected into the mold cavity exerts said separative force against the mold sections while said injected plastic remains in a fluid state, the method comprising the step of injecting plastic material continuously into the mold cavity from the gate until the mold cavity is filled with said injected plastic material, with said injection being under such conditions of injection pressure, injected plastic material temperature, mold cavity wall temperature, flow channel length, distance between flow channels, flow channel thickness and wall thickness in a thin-cavity region between flow channels that initially injected plastic material solidifies in the thin-cavity regions prior to the mold cavity being filled with the injected plastic material to thereby reduce said separative force.

10. A method according to claim 9, comprising the step of maintaining the mold cavity, as defined by the mold sections, without change in configuration during said continuous injection of plastic material.

11. A method according to claim 9, comprising the step of forming said mold cavity with a plastic material portion that previously was injected onto one of said one mold sections being included in said mold cavity.

12. A method of reducing a separative force exerted against mold sections when injection molding a hollow plastic product that is injected by using a first mold section and a second mold section that are combined to define a mold cavity for the product therebetween, and which mold sections, when so combined, are separated by a parting line, wherein the mold cavity includes a gate and flow channels extending through a region of the cavity, wherein plastic material injected into the mold cavity exerts said separative force against the mold sections while said injected plastic remains in a fluid state, the method comprising the steps of (a) forming said mold cavity in which within a portion of the mold cavity, the quotient of a ratio of flow channel length to distance between flow channels divided by the square of a ratio of flow channel thickness to wall thickness in a thin-cavity region between flow channels is less than two; and (b) injecting plastic material continuously into the mold cavity from the gate until the mold cavity is filled with said injected plastic material, with said injection being under such conditions of injection pressure, injected plastic material temperature and mold cavity wall temperature that initially injected plastic material solidifies in the thin-cavity regions prior to the mold cavity being filled with the injected plastic material to thereby reduce said separative force.

* * * * *